United States Patent
Iida et al.

(10) Patent No.: US 6,980,227 B2
(45) Date of Patent: Dec. 27, 2005

(54) ELECTRONIC ENDOSCOPE WITH LIGHT-AMOUNT ADJUSTMENT APPARATUS

(75) Inventors: Mitsuru Iida, Saitama (JP); Haruhiko Hibi, Tokyo (JP); Kenichi Iriyama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 478 days.

(21) Appl. No.: 10/260,335

(22) Filed: Oct. 1, 2002

(65) Prior Publication Data

US 2003/0076411 A1 Apr. 24, 2003

(30) Foreign Application Priority Data

Oct. 1, 2001 (JP) .............................. 2001-304873

(51) Int. Cl.[7] .............................................. H04N 9/47
(52) U.S. Cl. ...................................................... 348/69
(58) Field of Search ........................ 348/69–97, 229.1; 600/118, 180; 382/54; H04N 9/47

(56) References Cited

U.S. PATENT DOCUMENTS

| | | | |
|---|---|---|---|
| 5,148,502 A | * | 9/1992 | Tsujiuchi et al. ........... 382/255 |
| 5,864,361 A | | 1/1999 | Sekiya et al. |
| 6,063,023 A | * | 5/2000 | Sakiyama et al. .......... 600/118 |
| 6,231,504 B1 | | 5/2001 | Honda et al. |
| 6,261,228 B1 | | 7/2001 | Honda et al. |
| 6,299,577 B1 | | 10/2001 | Honda et al. |
| 6,319,198 B1 | | 11/2001 | Takahashi |
| 6,328,692 B1 | | 12/2001 | Honda et al. |
| 6,475,141 B2 | * | 11/2002 | Abe ........................... 600/180 |
| 6,677,992 B1 | * | 1/2004 | Matsumoto et al. ..... 348/229.1 |

* cited by examiner

*Primary Examiner*—Tung Vo
(74) *Attorney, Agent, or Firm*—Greenblum & Bernstein, P.L.C.

(57) ABSTRACT

An electronic endoscope has a video-scope with an image sensor and a video-processor. The video-scope has an objective lens and an illuminating lens in a tip portion. Further, the electronic endoscope has a luminance calculator and a light-amount adjuster. The luminance calculator divides the total area of a subject image into a plurality of division areas, defines weighted areas from the plurality of division areas in accordance with the tip characteristics of the video-scope, and calculates a total luminance value of the subject image by putting priority on predetermined weighted areas relative to the other areas. The light-amount adjuster adjusts the quantity of light illuminating the subject in accordance with the total luminance value.

10 Claims, 7 Drawing Sheets

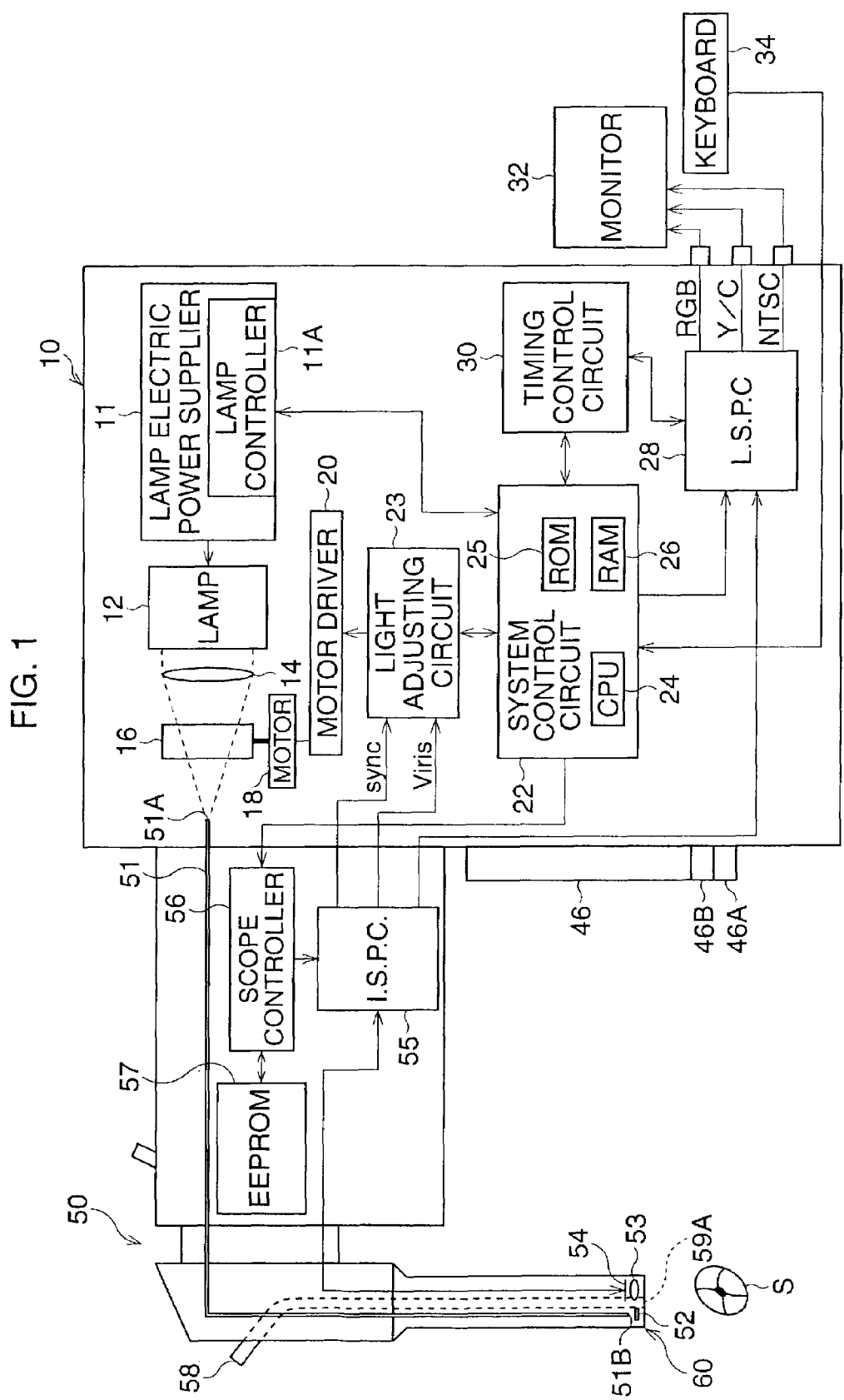

ELECTRONIC ENDOSCOPE WITH LIGHT-AMOUNT ADJUSTMENT APPARATUS

BACKGROUND OF THE INVENTION

1. Field of the Invention

The present invention relates to an electronic endoscope for observing or operating on the inside of an organ, such as a stomach. Particularly, the present invention relates to adjusting the brightness of a subject image displayed on a monitor.

2. Description of the Related Art

In an electronic endoscope, light emitted from a light source passes through a fiber-optic bundle provided in a video-scope, and is radiated from the tip of the video-scope via an illuminating lens. A subject to be observed is illuminated by the radiated light, and then a subject image is formed on an image sensor via an objective lens provided at the tip portion. Image signals generated in the image sensor are read and various processes are carried out on the image signals so that the subject image is displayed on the monitor.

In general, to maintain proper brightness of the subject image, the quantity of light illuminating the subject is automatically adjusted. In a conventional electronic endoscope, for adjustment of the quantity of light, a stop (diaphragm) is provided between the light source and an incident surface of the fiber-optic bundle, and is controlled such that the brightness of the displayed subject image is maintained at a constant level. A representative luminance value, indicating the brightness of the subject image is successively calculated on the basis of the image signals. Then, the control of the stop is performed at regular time-intervals, in accordance with the difference between the calculated luminance value and a reference value indicating a proper brightness. For calculating the luminance value, namely, for the metering, the average metering or the peak metering is performed. In the case of the average metering, an average value of one frame worth of the subject image is calculated. On the other hand, in the case of the peak metering, a relatively high luminance value among the one frame worth of the subject image is defined as the representative luminance value. The operator selects the metering method as required.

The characteristics of the tip portion of the video-scope, such as the radius, the relative position of the objective lens and the illuminating lens, and so on, vary with the observed organ, such as a stomach, bronchi, a colon, and so on. Especially, the arrangement relationship between the objective lens and the illuminating lens is different. Consequently, the distribution characteristics of the light-amount on the image sensor vary with the characteristics of the tip portion. However, when the light adjustment is performed without regard to the tip characteristics, the luminance value cannot be properly calculated for a specific video-scope, so that the brightness of the subject image cannot be maintained at a proper level.

SUMMARY OF THE INVENTION

Therefore, an object of the present invention is to provide an electronic endoscope that properly adjusts the amount of light illuminating the subject in accordance with the tip characteristics of a connected video-scope.

An electronic endoscope according to the present invention has a video-scope with an image sensor and a video-processor. A plurality of video-scopes are connectable to the video-processor, and the video-scope, which is one of the plurality of video-scopes, is selectively connected to the video-processor. The electronic endoscope has a light source that emits light. An illuminating lens and an objective lens are provided in the tip of the video-scope. The illuminating lens transmits the light, which is emitted from the light source and is radiated from the tip of the video-scope, to a subject so that the subject is illuminated. The objective lens forms a subject image on the image sensor.

The electronic endoscope according to the present invention has further an image processor, a tip characteristic detector, a metering setter, a luminance calculator, and a light-amount adjuster. The image processor generates luminance signals from image signals, which are read from the image sensor. The tip characteristic detector detects the tip characteristics corresponding to the attached the video-scope. The tip characteristics include at least the arrangement relationship between the objective lens and the illuminating lens. The metering setter defines a plurality of division areas by dividing the total area of the subject image into a plurality of areas and sets a plurality of weighted coefficients corresponding to the plurality of division areas, in accordance with the tip characteristics. The luminance calculator calculates a plurality of segment luminance values corresponding to the plurality of division areas, and calculates a total luminance value indicating the total brightness of the subject image. At this time, the luminance calculator multiplies each of the plurality of the segment luminance values by a corresponding weighted coefficient among the plurality of weighted coefficients. The light-amount adjuster adjusts the quantity of light illuminating the subject in accordance with the total luminance value.

The automatic light-amount adjustment apparatus for the electronic endoscope, according to the present invention, has an image processor that generates luminance signals from image signals read from the image sensor, a tip characteristic detector that detects the tip characteristics corresponding to a type of the video-scope, a metering setter that defines a plurality of division areas by dividing the total area of the subject image into a plurality of areas and sets a plurality of weighted coefficients corresponding to the plurality of division areas, in accordance with the tip characteristics, a luminance calculator that calculates a plurality of segment luminance values corresponding to the plurality of division areas, and calculates a total luminance value indicating a total brightness of the subject image, by multiplying each of the plurality of the segment luminance values by a corresponding weighted coefficient among the plurality of weighted coefficients, and a light-amount adjuster that adjusts a quantity of light illuminating the subject in accordance with the total luminance value. The tip characteristics include at least the arrangement relationship between an objective lens and an illuminating lens provided in the tip of the video-scope.

The electronic endoscope according to the present invention has a video-scope with an image sensor and a video-processor. The video-scope has an objective lens and an illuminating lens in a tip portion of the video-scope. The electronic endoscope has a luminance calculator and a light-amount adjuster. The luminance calculator divides the total area of a subject image into a plurality of division areas, assigns weighted areas to the plurality of division areas in accordance with the tip characteristics of the video-scope, which includes at least the arrangement relationship between an objective lens and an illuminating lens, and calculates a total luminance value of the subject image by putting the priority on the weighted areas relative to the other areas. The light-amount adjuster adjusts a quantity of light illuminating the subject in accordance with the total luminance value.

BRIEF DESCRIPTION OF THE DRAWINGS

The present invention will be better understood from the description of the preferred embodiment of the invention set fourth below together with the accompanying drawings, in which:

FIG. 1 is a block diagram of an electronic endoscope according to the present embodiment.

DESCRIPTION OF THE PREFERRED EMBODIMENTS

Figure 2A:
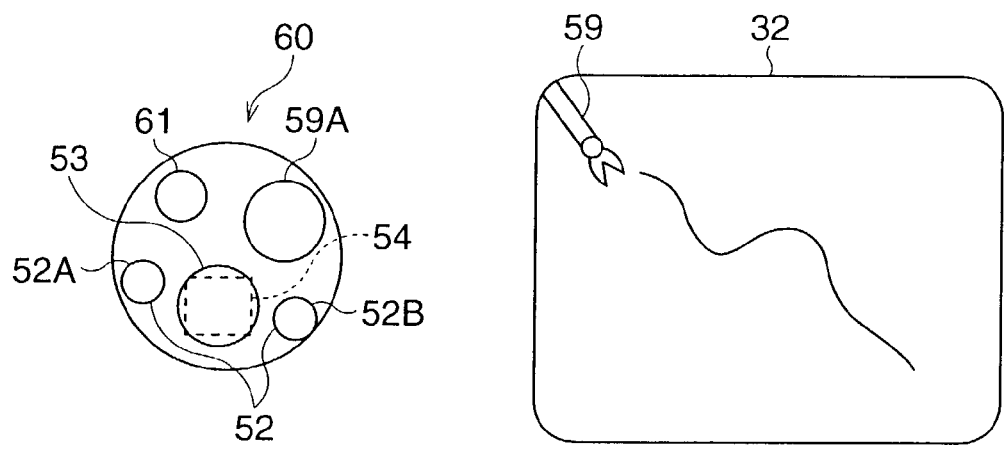
FIGS. 2A and 2B are views showing the tip portion of the video-scope and an image of both a subject and an implement.

Hereinafter, the preferred embodiment of the present invention is described with reference to the attached drawings.

FIG. 1 is a block diagram of an electronic endoscope according to a present embodiment.

In the electronic endoscope, a video-scope 50 with a CCD (Charge-Coupled Device) 54 and a video-processor 10, which processes image signals read from the CCD 54, are provided. A monitor 32 for displaying a subject image and a keyboard 34 for inputting character information are respectively connected to the video-processor 10. The video-scope 50 is detachably connected to the video-processor 10. When an operation or inspection is started, the video-scope 50 is inserted into a body.

When a lamp switch (not shown) is turned ON, electric power is supplied from a lamp electric power supplier 11 with a lamp controller 11A, to a lamp 12. Thus, light is emitted from the lamp 12. The emitted light enters into an incidence surface 51A of a fiber-optic bundle 51 via a condenser lens 14. The fiber-optic bundle 51 is a bundle for transmitting the light from the incidence surface 51 to the tip portion 60. The light that enters passes through the fiber-optic bundle 51 and is radiated from the distal end surface 51B of the fiber-optic bundle 51. Consequently, the radiated light passes through an illuminating lens 52 and illuminates a subject (observed portion) S. Further, a forceps tube 58 and water and air supplying tubes (not shown) are provided in the video-scope 50. An implement (herein not shown) for operating is inserted into the forceps tube 58 as required.

Light reflected on the subject S passes through an objective lens 53 and then reaches the CCD 54 provided in the tip portion 60. Consequently, the subject image is formed on the CCD 54. In this embodiment, for the color imaging process, the on-chip color filter method using single color filter array is applied. On a photo-sensitive area of the CCD 54 (herein not shown), a color filter array (not shown), checkered by four color elements of Yellow (Y), Magenta (M), Cyan (C), and Green (G), is arranged such that the four color elements are opposite the pixels arranged in the photo-sensitive area. In the CCD 54, color image signals, corresponding to light passing through the color elements, are generated by the photoelectric transform effect. The generated color image signals are read from the CCD 54 at regular time intervals in accordance with the so called "color difference line sequential system". In this embodiment, the NTSC standard is applied as the color TV standard, accordingly, one field (frame) worth of image signals is read from the CCD 54 at 1/60 (1/30) second time intervals, and is then fed to an initial signal processing circuit 55.

In the initial signal processing circuit 55, various processes are performed for the image signals, so that video signals including luminance signals and color difference signals are generated. Further, the initial signal processing circuit 55 has a CCD driver (not shown), which feeds driving signals to the CCD 54. The generated video signals are fed from the initial signal processing circuit 55 to a latter signal processing circuit 28 in the video-processor 10, and luminance signals are further fed to a light adjusting circuit 23. Synchronizing signals also are fed to the light adjusting circuit 23 in accordance with the luminance signals fed to the light adjusting circuit 23.

In the latter signal processing circuit 28, various processes, such as an image-outline correction, are performed for the video signals. The processed video signals are output to the monitor 32 as NTSC composite signals, S-video signals, and R, G, B component signals. Thus, the subject image is displayed on the monitor 32.

A system control circuit 22, including a CPU 24 (Central Processing Unit), a ROM (Read Only Memory) 25, and a RAM (Random Access Memory) 26, controls the video-processor 10 and feeds control signals to the lamp controller 11A, the latter signal processing circuit 28, and so on. In a timing control circuit 30, clock pulses are output to each circuit in the video-processor 10, and synchronizing signals to be interleaved in the video signals are fed to the latter signal processing circuit 28. A program for controlling the video-processor 10 and data associated with a light-amount adjustment table described later, are stored in the ROM 25 in advance.

A stop 16, which is provided between the incidence surface 51a of the fiber-optic bundle 51 and the condenser lens 14, opens and closes by driving the motor 18. In this embodiment, the adjustment of the quantity of light, which passes through the stop 16, namely, the quantity of light which illuminates the subject S, is performed by the light adjusting circuit 23 constructed of a DSP (Digital Signal Processor). The analog luminance signals output from the initial signal processing circuit 55 are converted to digital luminance signals in an A/D converter (not shown) and are then fed to the light adjusting circuit 23. As described later, the subject image formed on the CCD 54 is divided into a plurality of areas. In the light adjusting circuit 23, a segment luminance value is calculated for each of these areas on the basis of the input luminance signals, and a representative luminance value, indicating a total brightness of the subject image, is calculated from the total of segment luminance values. The light adjusting circuit 23 feeds control signals to a motor driver 20 in accordance with the representative luminance value. The motor 18 drives the stop 16 in accordance with the control signals so that the stop 16 opens or closes such that the amount of light illuminating the subject S becomes constant.

A scope controller 56, provided in the video-scope 10, controls the video-scope 10, namely, outputs a control signal to the initial signal processing circuit 55, and then reads scope data associated with the video-scope 10, which includes the tip characteristics of the video-scope 10, from an EEPROM (Electronic Erasable Programmable ROM) 57. In the scope data, the pixel number of the CCD 54, the size of the CCD 54, the arrangement relationship between the illuminating lens 52 and the objective lens 53, and the position of a forceps outlet 59A, which is at the distal end of the forceps tube 58, are respectively stored as data. When the video-scope 10 is connected to the video-processor 10, the scope data is fed from the EEPROM 57 to the system control circuit 22. In the light adjusting circuit 23, automatic light-amount adjustment is performed in accordance with the scope data of the connected video-scope 50.

On a front panel 46 of the video-processor 10, a setting switch 46A for setting the reference luminance value is provided. The reference luminance value represents a standard luminance value in the automatic light-amount adjustment. When the operator operates the setting switch 46A, an operation signal is fed to the system control circuit 22. The reference luminance value data is temporarily stored in the RAM 26, and is fed to the light adjusting circuit 23. When the keyboard 34 is operated to display character information on the monitor 32, the operation signal is fed to the system control circuit 22. Consequently, a character signal is superimposed into the video signals in the latter signal processing circuit 28.

Figure 2B:
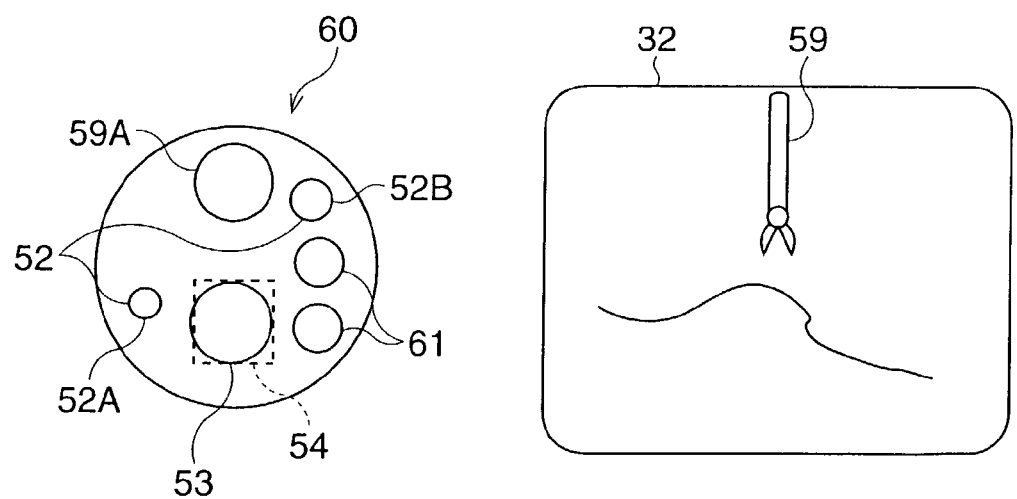

FIGS. 2A and 2B are views showing the tip portion 60 of the video-scope 50 and an image of subject and an implement.

In general, the arrangement of the illuminating lens and the objective lens depends upon the type of the video-scope, which is directly related to the organ to be observed. For example, in the case of the lower digestive tract, such as a colon, the radius of the tip portion of the video-scope is large. Further, a water transmitting tube for washing or staining the observed portion, and water and air supplying tubes for washing the objective lens are provided in the video-scope. The arrangement positions of the illuminating lens and the objective lens are influenced by the arrangement positions of the water transmitting tube and the water and air supplying tubes. On the other hand, in the case of a higher digestive tract and bronchi, the radius of the video-scope is small. Accordingly, the arrangement positions of the objective lens and the illuminating lens are restricted. In this embodiment, two types of video-scopes are prepared in advance and one of the two types is selectively connected to the video-processor 10. One type for the higher digestive tract is designated as "type A", and the other type for the lower digestive tract is designated as "type B".

In the case of the type A video-scope 50, the optic-fiber bundle forks at the tip portion 60, and the illuminating lens 52 is composed of two lenses 52A and 52B. Further, a water and air outlet 61 for the water and air supplying tubes is formed on the tip portion 60. The objective lens 53 is arranged between the illuminating lenses 52A and 52B, and the arrangement of the illuminating lenses 52A and 52B is symmetrical with the objective lens 53 (See FIG. 2A). Accordingly, the amount of light becomes equal over the total of the photo-sensitive area of the CCD 54. Similarly, in the case of the type B video-scope 50, the illuminating lens 52 is composed of two illuminating lenses 52A and 52B provided in the tip portion 60. However, two water and air outlets 61 are formed on the tip portion 60, one is used for the water supplying and the other is used for the air supplying, and the arrangement of the illuminating lenses 52A and 52B is nonsymmetrical with the objective lens 53. In the case of the type B video-scope 50, the distance between the illuminating lens 52A and the objective lens 53 is shorter than the distance between the illuminating lens 52B and the objective lens 53. Accordingly, the area of the total photo-sensitive area, which is close to the illuminating lens 52A, receives the light, by an amount much more than the other area.

In this way, the distribution of the light-amount on the photo-sensitive area varies with the arrangement relationship between the illuminating lenses 52, and the objective lens 53. Therefore, the detected brightness of the subject image varies with the characteristics of the tip portion, namely, the types of the video-scopes. In this embodiment, as described later, the brightness of the subject image is calculated in accordance with the tip characteristics of the video-scope.

Further, since the position of the forceps outlet 59A varies with the type of video-scope 50, the position of the implement tip image, which is displayed on the monitor 32 with the observed image, also varies with the type of used video-scope. As shown in FIG. 2A, in the case of the type A video-scope 50, the implement tip image 59 is displayed at upper-left position on the monitor 32. On the other hand, in the case of the type B video-scope 50, the implement tip image 59 is displayed in the upper-center position on the monitor 32. The displayed position of the implement tip 59 depends upon the arrangement relationship between the forceps 59A and the objective lens 53. When using the implement, in this embodiment, as described later, the brightness of the subject image is detected while considering the image of the metallic implement tip 59 that reflects the light for illuminating the subject.

Figure 3:
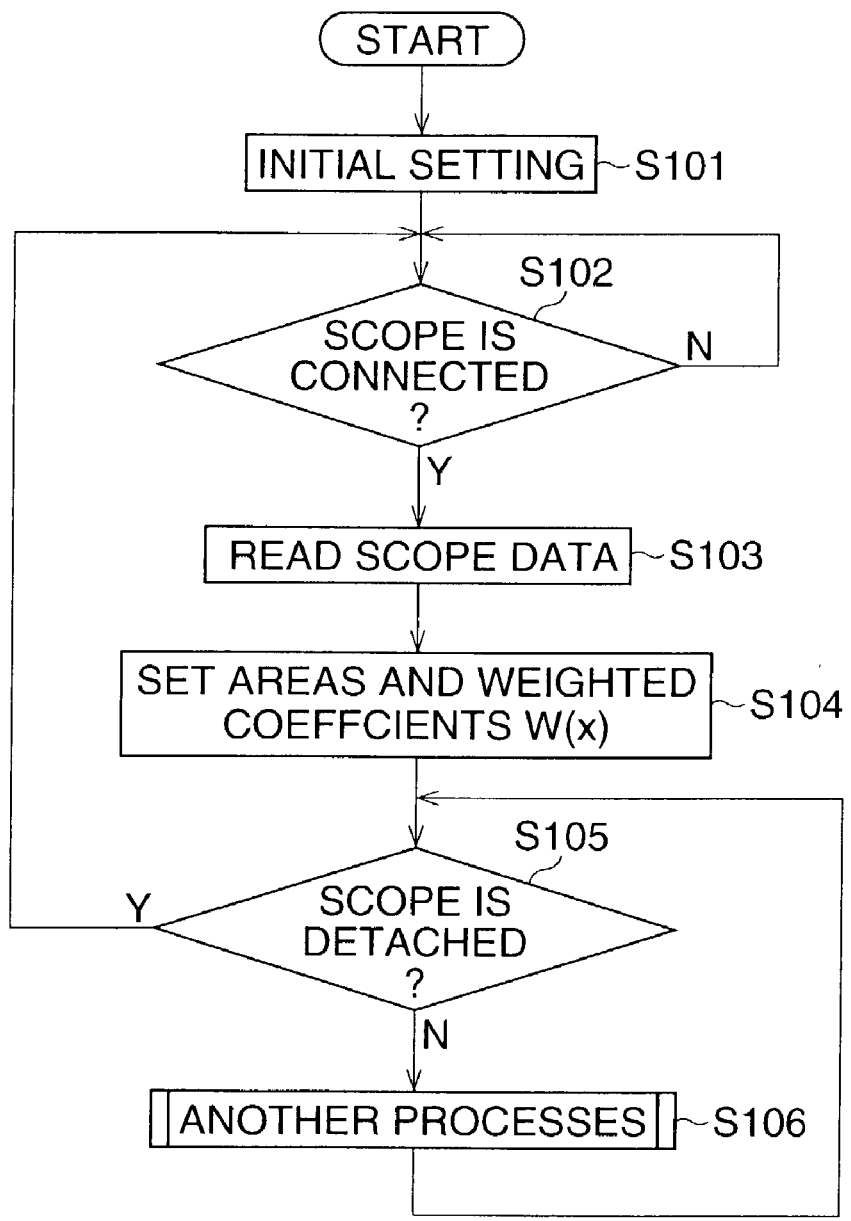
FIG. 3 is a view showing a main routine performed by the CPU of the video-processor.
Figure 4:
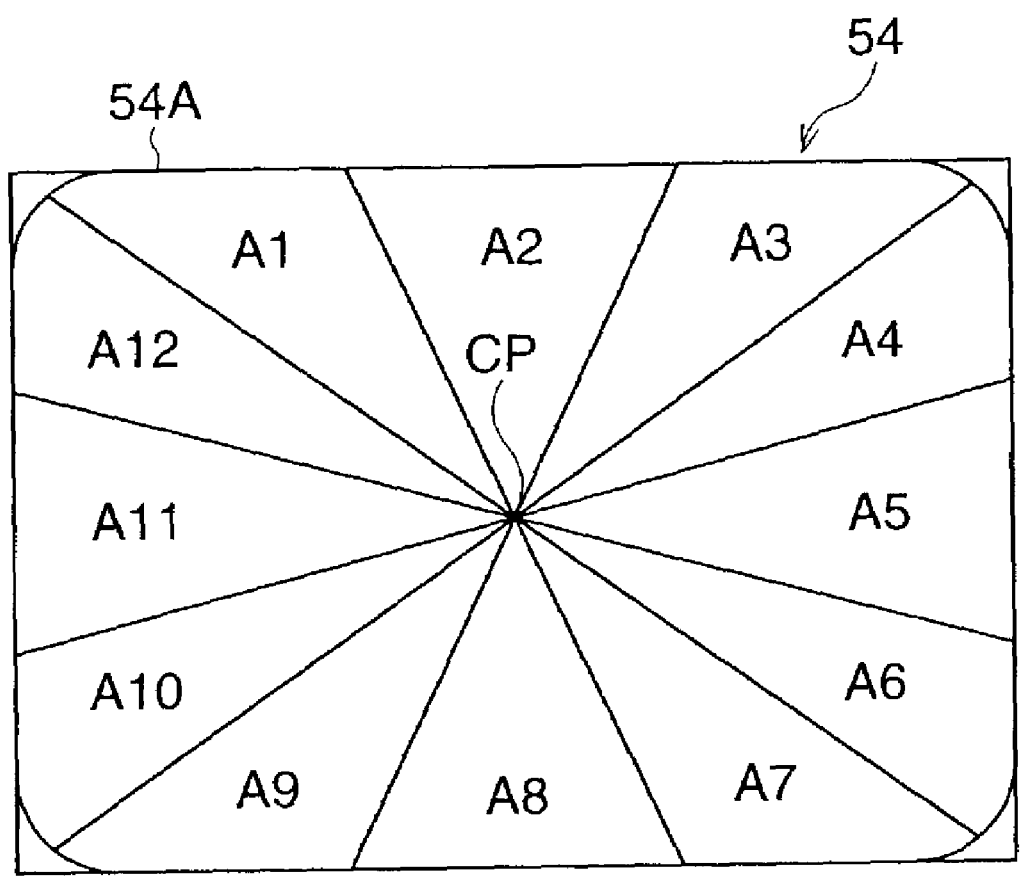
FIG. 4 is a view showing the photo-sensitive area of a CCD seen from the objective lens side.

FIG. 3 is a view showing a main routine performed by the CPU 24 of the video-processor 10. FIG. 4 is a view showing the photo-sensitive area of the CCD 54 seen from the objective lens side, seen from the tip side of the video-scope 50. When electric power is supplied, the process of the FIG. 3 is started.

In Step S101, the stop 16, the lamp 12 etc., are subjected to the initial setting. In Step S102, it is determined whether the video-scope 50 is connected to the video-processor 10. When it is determined that the video-scope 50 is not connected to the video-processor 10, Step S102 is repeatedly performed. On the other hand, when it is determined that the video-scope 50 is connected to the video-processor 10, the process goes to Step S103.

In Step S103, the scope data including the tip characteristics of the video-scope 50 are read from the EEPROM 57 in the video-scope 50. Then, in Step S104, the division pattern of the photo-sensitive area 54A and the values of the weighted coefficients for the division areas are defined in accordance with the tip characteristics.

As shown in FIG. 4, in this embodiment, the photo-sensitive area 54A of the CCD 54 is divided into 12 areas (herein, designated as "area A1", "area A2", "area A3", ..., "area A12"). The twelve division areas A1 to A12 are defined by radially drawing a boundary line from the center point CP. Note that, in this embodiment, the pixel number of the CCD 54 is smaller than the pixel number of the image area of the monitor 32. Then, 12 weighted coefficients W(x) (X=1, 2, ..., 12), are set in accordance with the 12 division areas. When the video-scope 50 is connected to the video-processor 10, values of the 12 weighted coefficients W(x) are defined in accordance with the type of connected video-scope 50, namely, the tip characteristics. The values of the weighted coefficients W(x) are different for each type of the video-scope 50, and are stored in advance in the ROM 25 as light-amount adjustment table data. The total luminance value of the subject image is calculated on the basis of the segment luminance values corresponding to the 12 division areas and the 12 weighted coefficients W(x).

As described above, in the case of the type A video-scope 50, since the arrangement of the illuminating lens 52A and 52B has symmetry, the distribution of the light-amount on the photo-sensitive area 54A of the CCD 54 becomes equal in each division area. Accordingly, when the type A video-scope 50 is connected to the video-processor 10, the values of the weighted coefficients W(x) are set such that all of the values become equal. This indicates that the total luminance value is calculated by using so called "average metering" when using the type A video-scope 50. Herein, the values of the weighted coefficients W(x) are respectively defined to "1".

On the other hand, in the case of the type B video-scope 50, the light-amount of the division areas A5, A6, and A7 is less than the other division areas A1 to A4 and A8 to A12, because the arrangement of the illuminating lens 52A and 52B is nonsymmetrical as described above (See FIG. 2B) and the division areas A5, A6, and A7 are far from the illuminating lenses 52A and 52B. Accordingly, the values of the weighted coefficients W(5), W(6), and W(7) are defined such that they become smaller than the values of the weighted coefficients of the other division areas, as follows:

$$W(x)=1.2 \ (X=1, 2, 3, 4, 8, 9, 10, 11, 12) \quad (1)$$

$$W(x)=0.8 \ (X=5, 6, 7) \quad (2)$$

This indicates that the total luminance value is calculated by so called "weighted average metering" when using the type B video-scope 50. Herein, the division areas except for A5, A6, and A7 are designated as "weighted areas".

In Step S104, the weighted coefficients W(x) for the connected video-scope 50 are read from the ROM 25 in accordance with the scope data fed from the EEPROM 57, and are then fed to the light adjusting circuit 23. Further, in Step S104, as described later, area data, corresponding to the arrangement of the forceps outlet 59A, is fed from the ROM 25 to the light adjusting circuit 23 in accordance with the arrangement data of the forceps outlet 59A, which is included in the scope-data. After Step S104 is performed, the process goes to Step S105.

In Step S105, it is determined whether the video-scope 50 has been detached from the video-processor 10 to connect another type of video-scope. When it is determined that the video-scope 50 has been detached from the video-processor 10, the process goes to Step S102. On the other and, when it is determined that the video-scope 50 has not been detached, the process goes to Step S106, wherein other processes, such as a process associated with the keyboard 34 and time display are performed. After Step S106 is performed, the process returns to Step S105. Steps S102 to S106 are repeatedly performed unless the main power switch is turned OFF.

Figure 5:
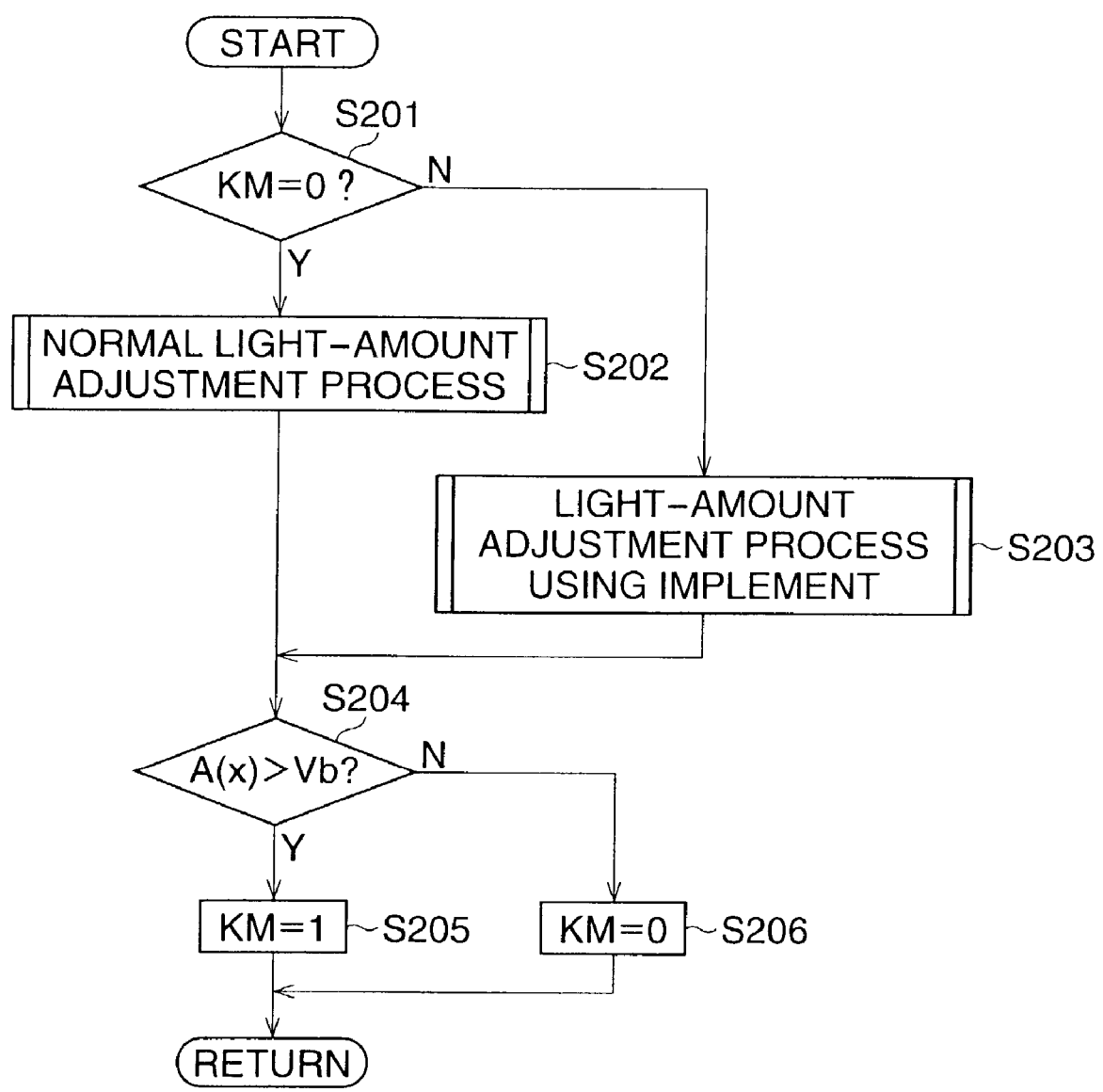
FIG. 5 is a view showing an interrupt routine associated with the automatic light-amount adjustment process performed in a light adjusting circuit.

FIG. 5 is a view showing an interrupt routine associated with the automatic light-amount adjustment process performed in the light adjusting circuit 23. This interrupt routine interrupts the main routine shown in FIG. 3, and is performed at 1/30 sec time-intervals, which corresponds to the scanning time. Note that, herein, the luminance level obtained for each pixel is divided into 256 levels (stages), and the range of luminance values is set to the range from 0 to 255.

In Step S201, it is determined whether halation generation variable "KM" is 0. When using a metallic implement during an operation, the tip portion of the implement projects from the forceps outlet 59A, so that a specific area, in which the implement tip image 59 is displayed, among the 12 division areas has a high luminance value due to the reflection of light from the implement. Thus, a white color portion is generated, namely, a halation is generated in the monitor 32. The halation generation variable "KM" is used in a situation where a halation is substantially generated. As described later, when a halation is generated by using an implement, the halation variable "KM" is set to "1", whereas the halation variable "KM" is set to "0" when a halation is not generated. When it is determined that the halation generation variable is 0, the process goes to Step S202, wherein a normal light-amount adjustment process is performed.

Figure 6:
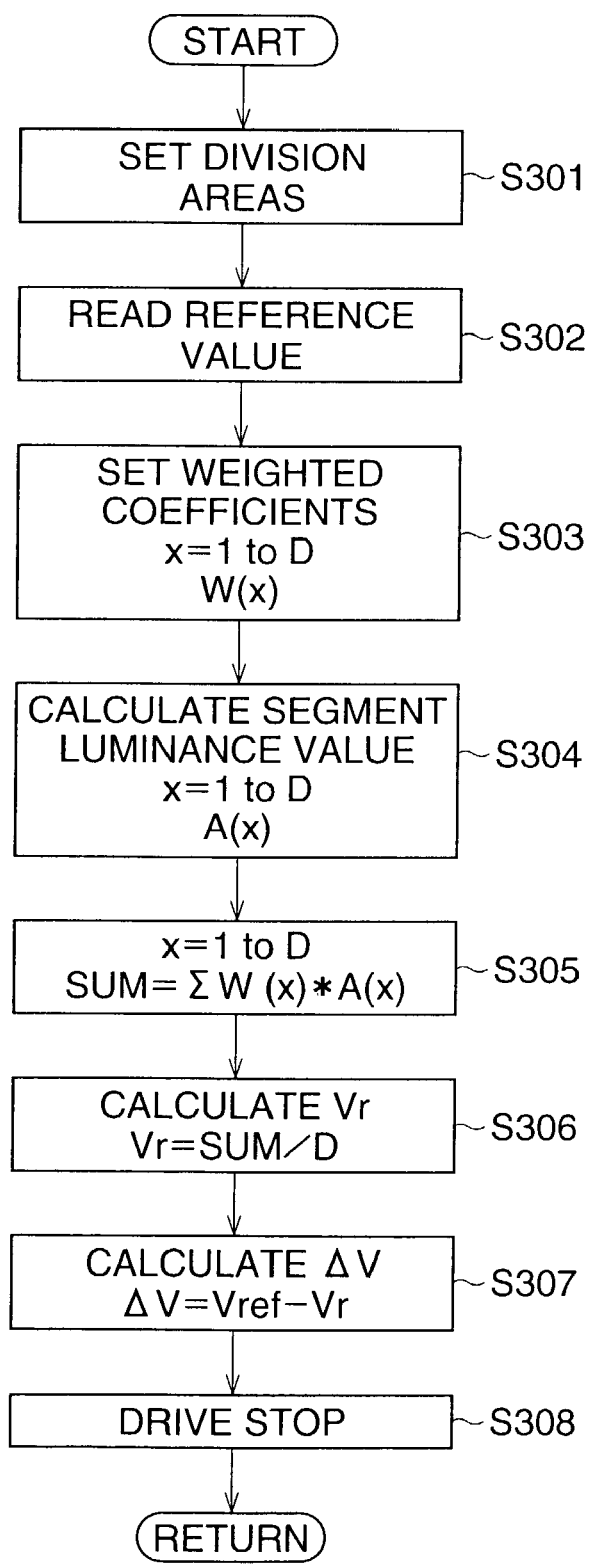
FIG. 6 is a view showing a subroutine of Step S202 in FIG. 5.

FIG. 6 is a view showing a subroutine of Step S202 in FIG. 5. In Step S301, the division areas and the division number D are set in the light adjusting circuit 23. In this embodiment, the twelve division areas A1 to A12 are set as shown in FIG. 4, and the division number D is 12. In Step S302, the reference value $V_{ref}$, which is a preset value or a value set by the operator, is read from the RAM 25. Herein, the reference value $V_{ref}$ is set to "128". In Step S303, the values of the weighted coefficients W(x) (x=1 to 12) are set in accordance with the weighted coefficients data fed from the system control circuit 22. In the case of the type A video-scope 50, all of the values of the weighted coefficients W(x) are set to "1". On the other hand, in the case of the type B video-scope 50, the values of the weighted coefficients W(x) are set in accordance with the above formulae (1) and (2). After step S303 is performed, the process goes to Step S304.

In Step S304, the segment luminance values A(x) (x=1, 2, ..., 12), which indicate the representative luminance value in the corresponding division area, are calculated. Each of the segment luminance values A(x) is obtained by calculating the sum of the luminance values for each pixel and dividing the sum by the number of pixels constructing the subject image. In Step S305, the products of the weighted coefficients and the segment luminance values "W(X)×A(x)" are calculated for the 12 division areas A1 to A12, and a luminance sum SUM (=Σ W(x)×A(x), x=1, 2, ..., 12) is calculated.

In Step S306, the luminance sum SUM is divided by the area number D (=12), so that the total luminance value $V_r$, which is the representative luminance value indicating the brightness of the total subject image, is calculated. After Step S306 is performed, the process goes to Step S307.

In Step S307, a luminance difference ΔV between the total luminance value $V_r$ and the reference luminance value $V_{ref}$ is calculated. In Step S308, a control signal is fed to the motor driver 20 in accordance with the luminance difference ΔV. Thus, the stop 16 is driven by a given amount corresponding to the luminance difference ΔV. After Step S308 is performed, the process returns to Step S202 in FIG. 5, and goes to Step S204.

On the other hand, when it is determined that the halation generation variable KM is 1 in Step S201 shown in FIG. 5, namely, a halation has been generated, the process goes to Step S203.

Figure 7:
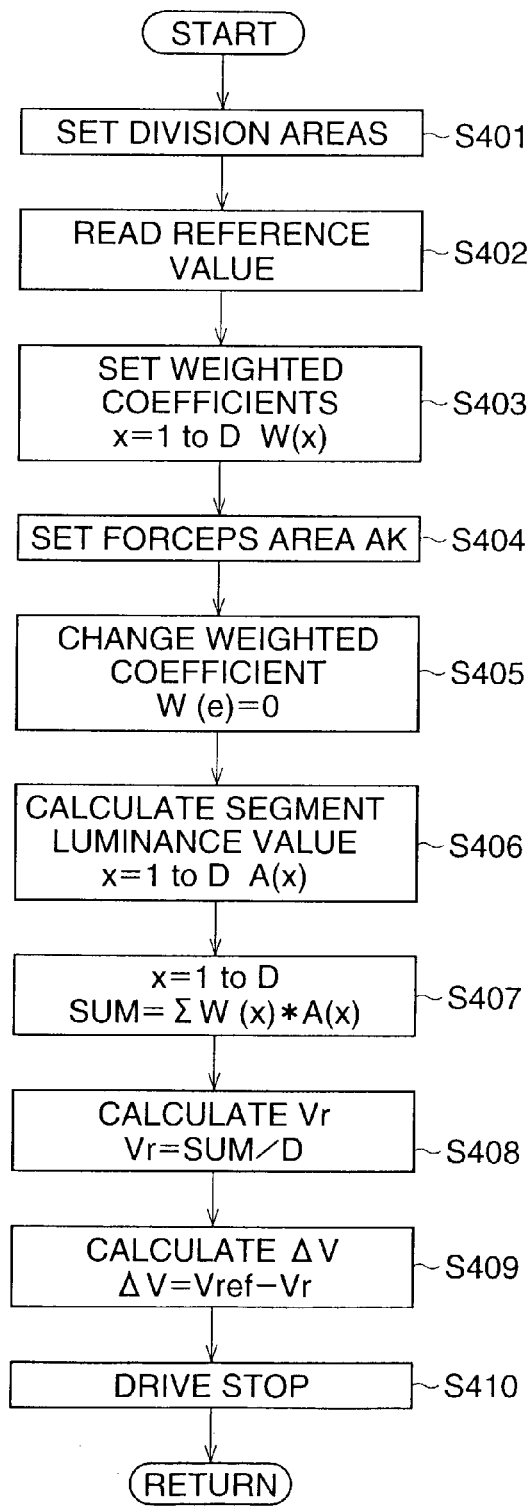
FIG. 7 is a view showing a subroutine of Step S203 in FIG. 5.

FIG. 7 is a view showing a subroutine of Step S203 in FIG. 5. The performance of Steps S401 to S403 corresponds to the performance of Steps S301 to S303 in FIG. 6. Namely, the division areas A1 to A12, the area number D, and the weighted coefficients W(x) are defined. In Step S404, for the forceps area AK among the twelve division areas A1 to A12, the value of the weighted coefficient W(e) is set to "0". Note that, the forceps area AK indicates the specific area, in which the implement tip portion 59 is displayed. For example, in the case of the type B video-scope 50, since the implement tip image is formed in the division area A2, the division area A2 is set as the forceps area AK and the weighted coefficient W(e=2) is set to "0". On the other hand, in the case of the type A video-scope 50, since the implement tip image is formed in the division area A4, the division area A4 is set as the forceps area AK and the weighted coefficient W(e=4) is set to "0". Forceps Data associated with the forceps area AK is stored in the EEPROM 57 in advance. When the video-scope 50 is connected to the video-processor 10, the forceps data is read from the EEPROM 57 in Step S103 and is then fed to the light adjusting circuit 23 in addition to the weighted coefficient data in Step S104 (See FIG. 3). After Step S405 is performed, the process goes to Step S406.

The performance of Steps S406 to S410 corresponds to the performance of Steps S304 to S308 in FIG. 6. Namely, the total luminance value $V_r$ is calculated, and the stop 16 is driven in accordance with the luminance difference $\Delta V$ between the total luminance value $V_r$ and the reference luminance value $V_{ref}$. At this time, for the calculation of the total luminance value $V_r$, the products of the segment luminance value A(x=e) and the corresponding weighted coefficient W(e) become "0". After step S410 is performed, the process returns to Step S203 and goes to Step S204 in FIG. 5.

In Step S204, it is determined whether the segment luminance value A(x) corresponding to the forceps area AK is larger than a boundary luminance value Vb. The boundary luminance value Vb is a threshold value regarding the halation. When the segment luminance value A(x) is larger than the boundary luminance value Vb, it is regarded that a halation has been generated due to the implement tip portion 59. Herein, the boundary luminance value Vb is set to "220".

When it is determined that the segment luminance value A(x) corresponding to the forceps area AK is larger than the boundary luminance value Vb in Step S204, namely, the forceps area AK is remarkably bright compared to the other division areas, the process goes to Step S205, wherein the halation generation variable KM is set to "1". Consequently, in the next interrupt routine, the process goes from Step S201 to Step S203. On the other hand, when it is determined that the segment luminance value A(x) corresponding to the forceps area AK is not larger than the boundary luminance value Vb, namely, the implement is not being used, the process goes to Step S206, wherein the halation generation variable KM is set to "0". Consequently, in the next interrupt routine, the process goes from Step S201 to step S202. When Step S205 or Step S206 is performed, this interrupt routine is terminated.

In this way, in this embodiment, the scope data including the tip characteristics are read from the EEPROM 57 in the video-scope 50, and the weighted coefficients W(x) are defined in accordance with the scope-data. The weighted coefficient data are fed to the light adjusting circuit 23, and then the segment luminance values A(x) and the total luminance value $V_r$ are calculated. The stop 16 is controlled in accordance with the luminance difference $\Delta V$.

In the case of the type B video-scope 50, the values of the weighted coefficients W(5), W(6), and W(7) are set to smaller values compared to the other weighted coefficients W(1), W(2), W(3), W(4) W(8) W(9) W(10) W(11), and W(12). Thus, the proper total luminance value $V_r$ is calculated so that the brightness of the subject image is always properly maintained. Also, in the case of the type A video-scope 50, since all of the weighted coefficients W(x) are set to "1", the proper total luminance value $V_r$ is calculated.

Further, in this embodiment, the forceps area data is read from the EEPROM 57 and is then fed to the light adjustment circuit 23. Then, the weighted coefficient W(x) corresponding to the forces area AK is set to "0". Thus, the proper total luminance value $V_r$ is calculated even when using the implement.

Other types of video-scopes connectable to the video-processor 10 may be prepared in advance in addition to the type A and B the video-scopes 50. In this case, weighted coefficients, namely, the metering method corresponding to the tip characteristics need to be defined.

The weighted coefficient data may be stored in the EEPROM 57 of the video-scope 50 in place of the ROM 25 in the video-processor 10. In this case, the weighted coefficient data is directly read by the video-processor 10.

The illuminating lens 52 may be composed of a single lens. The total luminance value Vr may be calculated by other calculation methods in place of the above calculation method (Step S306, S408). The segment luminance values A(x) may also be calculated by other calculation methods.

In this embodiment, the pixel number of the CCD 54 is smaller than the pixel number on the image area of the monitor 32. When the pixel number is larger than the pixel number of the image area, the division areas are defined on the basis of image to be displayed on the image area of the monitor 32 in place of the photo-sensitive area 54A.

In this embodiment, the lamp 12 and the signal processing circuits including the latter signal processing circuit 128 are provided in the video-processor 10, however, an independent light source apparatus and an independent signal process apparatus may be provided.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.2001-304873 (filed on Oct. 1, 2001) which is expressly incorporated herein, by reference, in its entirety.

What is claimed is:

1. An electronic endoscope having a video-scope with an image sensor and a video-processor, said video-scope being one of a plurality of connectable video-scopes and being selectively connected to said video-processor, said electronic endoscope comprising:
    a light source that emits light;
    an illuminating lens that is provided in a tip of said video-scope and that transmits the light to a subject;
    an objective lens that is provided in the tip of said video-scope and that forms a subject image on said image sensor;
    an image processor that generates luminance signals from image signals read from said image sensor;
    a tip characteristic detector that detects tip characteristics corresponding to a type of said video-scope, the tip characteristics including at least an arrangement relationship between said objective lens and said illuminating lens;
    a metering setter that defines a plurality of division areas by dividing the total area of the subject image into a plurality of areas and that sets a plurality of weighted coefficients corresponding to the plurality of division areas, in accordance with the tip characteristics;

a luminance calculator that calculates a plurality of segment luminance values corresponding to the plurality of division areas, and that calculates a total luminance value indicating a total brightness of the subject image by multiplying each of the plurality of the segment luminance values by a corresponding weighted coefficient among the plurality of weighted coefficients; and a light-amount adjuster that adjusts a quantity of light illuminating the subject in accordance with the total luminance value.

2. The electronic endoscope of claim 1, wherein said metering setter assigns high-luminance weighted coefficients to high-luminance areas that have higher segment luminance values relative to the other division areas, due to the tip characteristics, the values of the high-luminance weighted coefficients being larger than the values of the weighted coefficients for the other division areas, and wherein said luminance calculator performs a weighted average metering by setting said high-luminance areas as weighted areas.

3. The electronic endoscope of claim 1, wherein said metering setter sets the values of the weighted coefficients to same values in accordance with the tip characteristics, and wherein said luminance calculator performs an average metering to calculate the total luminance value.

4. The electronic endoscope of claim 1, wherein said illuminating lens includes two lenses and said objective lens is a single lens, and wherein the arrangement relationship includes a relationship regarding the position and the distance of said objective lens relative to said two lenses.

5. The electronic endoscope of claim 1, further comprising:

a forceps tube for installing an implement in said video-scope, a forceps outlet being formed in the tip of said video-scope, wherein the arrangement relationship includes a relationship regarding the position of the forceps outlet relative to said objective lens and said illuminating lens, wherein said metering setter defines a forceps area, in which an implement image is displayed, from the plurality of division areas in accordance with the tip characteristics, and wherein said luminance calculator determines whether a segment luminance value obtained in the forceps area is larger than a boundary luminance value corresponding to a halation generation, said luminance calculator calculating the total luminance value on the basis of division areas except for the forceps area when the segment luminance value is larger than the boundary luminance value.

6. The electronic endoscope of claim 1, wherein said metering setter radially divides the subject image.

7. The electronic endoscope of claim 1, further comprising:

a weighted coefficient memory that stores a series of weighted coefficient data having values of the plurality of weighted coefficients corresponding to the plurality of video-scopes, wherein said metering setter reads the weighted coefficient data corresponding to the tip characteristics from the series of weighted coefficient data and defines the values of the weighted coefficients.

8. The electronic endoscope of claim 1, further comprising:

a tip characteristic memory in said video-scope that stores the tip characteristics as data, wherein said tip characteristic detector detects the tip characteristics by reading the tip characteristics.

9. An automatic light-amount adjustment apparatus for an electronic endoscope, said electronic endoscope having a video-scope with an image sensor and a video-processor, said video-scope being one of a plurality of connectable video-scopes and being selectively connected to said video-processor, said video-scope having an objective lens and an illuminating lens in a tip of said video-scope, light for illuminating a subject being radiated from the tip via said illuminating lens, light reflected on the subject being directed to said image sensor via said objective lens, said automatic light-amount adjustment apparatus comprising:

an image processor that generates luminance signals from image signals read from said image sensor;

a tip characteristic detector that detects tip characteristics corresponding to a type of said video-scope, the tip characteristics including at least an arrangement relationship between said objective lens and said illuminating lens;

a metering setter that defines a plurality of division areas by dividing the total area of a subject image into a plurality of areas and that sets a plurality of weighted coefficients corresponding to the plurality of division areas, in accordance with the tip characteristics;

a luminance calculator that calculates a plurality of segment luminance values corresponding to the plurality of division areas, and that calculates a total luminance value indicating a total brightness of the subject image by multiplying each of the plurality of the segment luminance values by a corresponding weighted coefficient among the plurality of weighted coefficients; and a light-amount adjuster that adjusts a quantity of light illuminating the subject in accordance with the total luminance value.

10. An electronic endoscope having a video-scope with an image sensor and a video-processor, said video-scope having an objective lens and an illuminating lens in a tip portion, said electronic endoscope comprising:

a luminance calculator that divides a total area of a subject image into a plurality of division areas and that assigns weighted areas to the plurality of division areas in accordance with the tip characteristics of said video-scope, the tip characteristics including at least an arrangement relationship between said objective lens and said illuminating lens, and that calculates a total luminance value of the subject image by putting priority on the weighted areas relative to the other areas; and a light-amount adjuster that adjusts a quantity of light illuminating the subject in accordance with the total luminance value.

* * * * *